(12) United States Patent
Geiger et al.

(10) Patent No.: US 9,285,265 B2
(45) Date of Patent: Mar. 15, 2016

(54) INTEGRATED MODULE HAVING MULTIPLE LIGHT EMITTERS OR SENSORS FOR TELEVISIONS AND OTHER APPLIANCES

(71) Applicant: Heptagon Micro Optics Pte. Ltd., Singapore (SG)

(72) Inventors: Jens Geiger, Thalwil (CH); Susanne Westenhöfer, Wettswil (CH)

(73) Assignee: Heptagon Micro Optics Pte. Ltd., Singapore (SG)

(*) Notice: Subject to any disclaimer, the term of this patent is extended or adjusted under 35 U.S.C. 154(b) by 183 days.

(21) Appl. No.: 14/200,568

(22) Filed: Mar. 7, 2014

(65) Prior Publication Data

US 2014/0263973 A1      Sep. 18, 2014

Related U.S. Application Data

(60) Provisional application No. 61/783,144, filed on Mar. 14, 2013.

(51) Int. Cl.
*G01J 1/02* (2006.01)
*G01J 1/04* (2006.01)
*G01J 1/42* (2006.01)

(52) U.S. Cl.
CPC .............. *G01J 1/0204* (2013.01); *G01J 1/0271* (2013.01); *G01J 1/0411* (2013.01); *G01J 1/4204* (2013.01)

(58) Field of Classification Search
CPC ....... G01J 1/0204; G01J 1/0271; G01J 1/0411; G01J 1/4204
USPC ................. 250/208.2, 239, 578.1, 214 AL
See application file for complete search history.

(56) References Cited

U.S. PATENT DOCUMENTS

| | | | | |
|---|---|---|---|---|
| 6,459,083 | B1 * | 10/2002 | Finkele | B60Q 9/008 250/339.1 |
| 2011/0163233 | A1 * | 7/2011 | Ng | G01J 1/28 250/338.4 |
| 2013/0019461 | A1 | 1/2013 | Rudmann et al. | |

OTHER PUBLICATIONS

Texas Advanced Optoelectronic Solutions, "What Ambient Light Sensing Can Do for HDTVs," http://www.lcdtvassociation.org/images/TAOS_What_Ambient_Light_Sensing_Can_Do_For_HDTVs_LCDTVA_Newsletter_05132010.pdf, pp. 1-8 (Jan. 2010).

* cited by examiner

*Primary Examiner* — Seung C Sohn
(74) *Attorney, Agent, or Firm* — Fish & Richardson P.C.

(57) ABSTRACT

Compact optoelectronic modules are described and can be used in various electronic or other appliances, such as television units. For example, a light emitting device, a first sensor or sensor module such as an infra-red sensor or an infra-red receiver module, and a second sensor or sensor module such as an ambient light sensor or ambient light sensor module, can be integrated into a single compact optoelectronic module. Multiple such optoelectronic modules can be fabricated in a wafer-level process.

16 Claims, 2 Drawing Sheets

INTEGRATED MODULE HAVING MULTIPLE LIGHT EMITTERS OR SENSORS FOR TELEVISIONS AND OTHER APPLIANCES

This application claims the benefit of priority of U.S. Provisional Patent Application No. 61/783,144, filed on Mar. 14, 2013. The contents of the earlier application are incorporated herein by reference in their entirety.

FIELD OF THE DISCLOSURE

This disclosure relates to integrated modules having multiple light sensors and/or emitters for televisions and other appliances.

BACKGROUND

Various electronic appliances, such as televisions, notebook or laptop computers, and mobile phones, among others, include one or more light emitters and/or sensors that perform or facilitate various functions. An example of a light sensor that may be included in such appliances is an infra-red (IR) receiver to receive remote control signals from a source that is external to the appliance. Another example is an ambient light sensor for adjusting the brightness of a display screen. In some cases, for example, ambient light sensors can be used to analyze the ambient light in a room and automatically adjust television settings to improve picture quality by changing settings such as color saturation, contrast, and intensity of the backlight. Likewise, visible light emitters may be used, for example, as a status indicator (e.g., ON/OFF status) of the appliance. Such light sensors and emitters can increase the versatility of the appliance, and may increase its lifespan, reduce power consumption and/or provide cost savings associated with use of the appliance.

On the other hand, the desire to incorporate more and more optoelectronic devices into such appliances presents a challenge because of the additional space required for the devices. This issue can be particularly important, for example, to television manufacturers as well as manufactures of other electronic appliances and systems in which space is at a premium.

SUMMARY

The present disclosure describes compact optoelectronic modules that can be used, for example, in various electronic or other appliances, such as television units. In some implementations, for example, a light emitting device, an infra-red sensor or infra-red receiver module, and an ambient light sensor or ambient light sensor module can be integrated into a single compact optoelectronic module. Furthermore, multiple optoelectronic modules can be fabricated in a wafer-level process. Some implementations can provide various advantages. For example, the modules can be highly compact with a relatively small size, which can be important for appliances in which space is at a premium. Furthermore, the ability to fabricate many such modules in a parallel wafer-level process can help reduce the overall manufacturing costs.

In one aspect, a compact optoelectronic module includes a first substrate, a spacer, one end of which is attached to the first substrate, and a second substrate attached to a second end of the spacer. The spacer has walls that separate respective areas for a first optical channel, a second optical channel and a third optical channel. A light emitting device is mounted in the area for the first optical channel, a first sensor operable to detect radiation in a first range of the electromagnetic spectrum is mounted in the area for the second optical channel, and a second sensor operable to detect light in a second range of the electromagnetic spectrum is mounted in the area for the third optical channel. The second substrate includes respective transparent regions over the light emitting device, the first sensor and the second sensor. The first sensor can be, for example, an infra-red sensor that detects light in the infra-red region, and the second sensor can be, for example, an ambient light sensor that detects light in the visible range of the electromagnetic spectrum.

Various implementations can include one or more of the following features. For example, the light emitting device (e.g., a LED) can be operable to emit light in a visible portion of the electromagnetic spectrum. Each of the first and second sensors can comprise, for example, a photodiode. The first, second and third optical channels can be arranged in a row and, in some implementations, the first optical channel (for the light emitting device) is located on one side of the second optical channel (for the IR sensor) and the third optical channel (for the visible light sensor) is located on a second side of the second optical channel. This arrangement may help reduce optical cross-talk between the light emitting device and the visible light sensor.

The spacer can be composed of, or coated with, a material that is substantially opaque to radiation in those parts of the electromagnetic spectrum emitted by the light emitting device or detected by the first or second sensors. This feature also may help reduce optical cross-talk.

The optoelectronic module can include an infra-red receiver module mounted on the first substrate, wherein the infra-red receiver module includes the IR sensor. The infra-red receiver module also can include an integrated circuit operable to perform analog-to-digital conversion and signal processing on signals from the IR sensor. Likewise, the optoelectronic module can include an ambient light sensor module mounted on the first substrate, wherein the ambient light sensor module includes the visible light sensor. The ambient light sensor module also can include an integrated circuit operable to perform analog-to-digital conversion and signal processing on signals from the visible light sensor.

In some implementations, the second substrate includes one or more lens elements attached to each of the transparent regions. Each of the lens elements preferably is aligned with a respective one of the light emitting device, the first sensor or the second sensor. The lenses can help focus light to or from the sensors and/or light emitting device within the module.

According to another aspect, an apparatus includes an electrical cable (e.g., a flexible cable) and an optoelectronic module mounted on and electrically coupled to the electrical cable. In some implementations, integrated circuits operable to perform analog-to-digital conversion and signal processing for signals from the IR sensor and the visible light sensor are contained within the module. In other implementations, one or more integrated circuits to perform such analog-to-digital conversion and signal processing is mounted on the electrical cable and is, thus, external to the optoelectronic module. Each of the light emitting device, the infra-red sensor and the visible light sensor (or the associated integrated circuits if they are contained within the optoelectronic module) can be electrically coupled to the electrical cable by way of respective conductive vias through the first substrate and conductive pads on a surface of the first substrate.

In some implementations, the module can have more than three optical channels that are separated from one another by walls of the spacer, and each of the channels can contain a respective light emitting device or sensor. The function of each sensor can be different from the functions of the other sensors, and the functions of the sensors can be different from the function associated with the light emitting device(s). Thus, for example, each of the sensors can be arranged to detect light from a source other than the light emitting devices(s).

Other aspects, features and advantages will be readily apparent from the following detailed description, the accompanying drawings and the claims.

DETAILED DESCRIPTION

Figure 1:
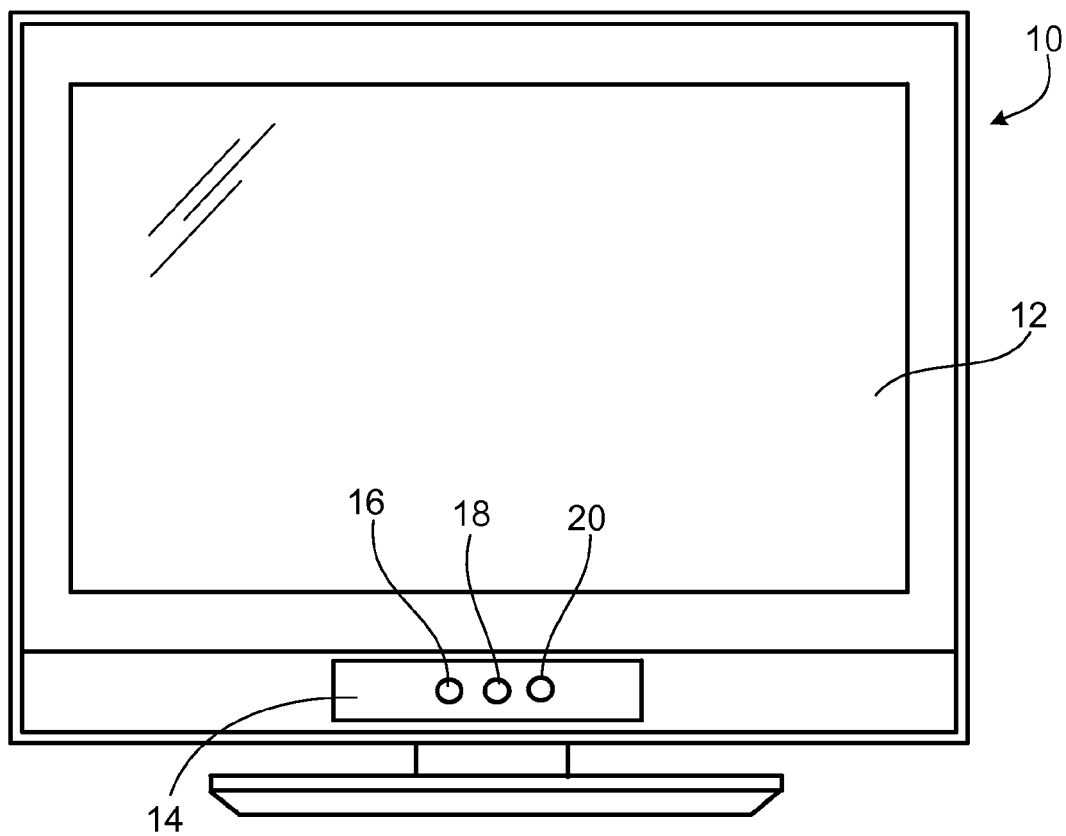
FIG. 1 illustrates an example of a television unit with multiple light sensors/emitters.

As illustrated in FIG. 1, a television unit 10, which is an example of electronic appliance that includes a display 12. A control panel 14 includes multiple windows 16, 18, 20 each of which is transparent to radiation in the visible and/or IR ranges.

In the illustrated example, situated behind first window 16 is a light emitting diode (LED) that emits light in the visible part of the spectrum (e.g., blue, red or green) and that serves as a human perceivable visible indicator to indicate the status of television unit 10 or some internal component within television unit 10. For example, in some situations, light can be emitted thought first window 16 to indicate whether television unit 10 is on. In some implementations, light emitted through first window 16 may flash on and off or may stay on to indicate there is a problem with television unit 10 or a particular component. In some implementations, multiple LEDs may be positioned behind first window 16 (or behind separate windows), and the LEDs may be controlled to emit light such that the combination of lights and/or the duration for which they remain on (or flicker) indicates that television unit 10 is in the process of performing some specified function or that some particular problem has occurred. Thus, in the illustrated example, the LED located behind window 16 is not used for image processing.

In the illustrated example, an IR receiver module (IRM) or a sensor (e.g., photodiode) that is operable to detect radiation in the IR range is situated behind second window 18. The IRM or IR sensor can be used, for example, to detect and process a signal from a remote control device in a known manner. Thus, the IRM or IR sensor can detect a signal from the remote control device so as to permit operation of television unit 10 (e.g., turning on and off of television unit 10, changing the channel, etc.) to be controlled remotely. In some implementations, the IR sensor is operable to detect radiation in a range that is centered about a narrow band in the IR part of the spectrum (e.g., 850 nm or 940 nm).

Situated behind third window 20 in the example of FIG. 1 is an ambient light sensor (ALS) that is sensitive to light in the visible part of the spectrum (e.g., 450 nm-650 nm). This sensor can be used, in known manner, to adjust the brightness of display 12.

In the illustrated example, windows 16, 18, 20 should be composed of a material (e.g., glass or plastic) that is transparent to the wavelength(s) of interest (i.e., depending on the wavelength(s) to be emitted or sensed by the optoelectronic devices positioned behind each window). Also, in the illustrated example, each of the light sensors positioned behind windows 18, 20 is associated with a different function from one another as well as different from the function associated with the LED located behind first window 16. In particular, the sensors behind windows 18, 20 are configured, respectively, to detect IR or visible radiation whose source is external to television unit 10.

Figure 2:
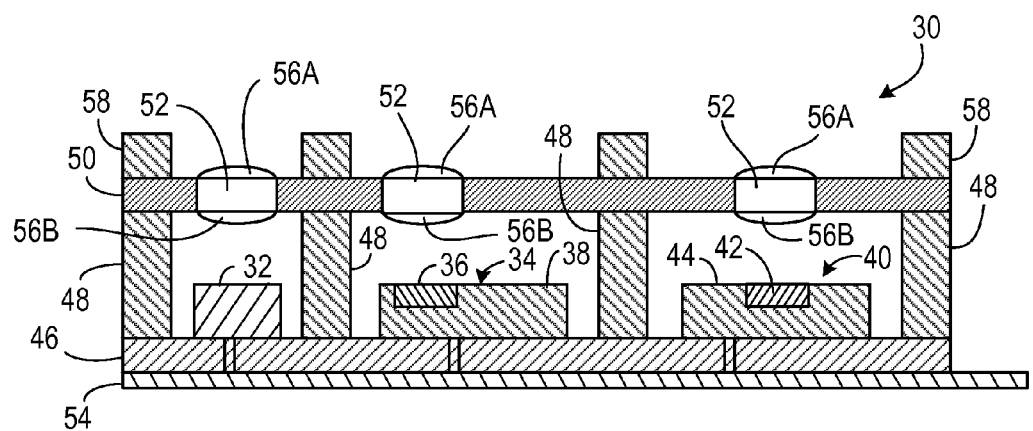
FIG. 2 illustrates an example of an optoelectronic module mounted on an electrical cable.

FIG. 2 illustrates a first example of a module 30 that includes three integrated optoelectronic devices 32, 34, 40 mounted on a substrate 46. Device 32 can be a LED that emits light in the visible part of the spectrum (e.g., blue, red or green) and that can provide a human perceivable visible indicator. Device 32 can be positioned, for example, behind window 16 when module 30 is incorporated into television unit 10 (see FIG. 1). In that case, device 32 should be substantially aligned with window 16 so that light emitted by device 32 passes through window 16.

Second device 34 can be an IR receiver module that includes an IR sensor (e.g., photodiode) 36 and associated circuitry 38. Circuitry 38 can be implemented, for example, as an integrated circuit (e.g., silicon chip) that includes signal processing and analog-to-digital conversion capabilities. Device 34 can be positioned, for example, behind window 18 when module 30 is incorporated into television unit 10 (see FIG. 1). In that case, device 34 should be substantially aligned with window 18 so that IR radiation passing through window 20 (e.g., from a remote control device) can be detected by IR sensor 36.

Third device 40 can be an ambient light sensor module that includes a visible light sensor (e.g., photodiode) 42 and associated circuitry 44. Circuitry 44 can be implemented, for example, as an integrated circuit (e.g., silicon chip) that includes signal processing and analog-to-digital conversion capabilities. Device 40 can be positioned, for example, behind window 20 when module 30 is incorporated into television unit 10 (see FIG. 1). In that case, device 40 should be substantially aligned with window 20 so that visible light passing through window 18 (i.e., from outside television unit 10) can be detected by visible light sensor 42.

Electrical connections can be provided from sensors 36, 42 to the associated IC circuit 38, 44 by way of wire bonding or other known techniques. Likewise, each of devices 32, 34, 40 can be coupled electrically to respective SMT pads or other electrical connections on the underside of substrate 46, which has conductive vias that extend through the substrate from the device side to the other side. Substrate 46 can be composed, for example, of a printed circuit board (PCB) material such as FR4, which is a grade designation assigned to glass-reinforced epoxy laminate material. The underside of substrate 46 can include electrical connections such as SMT pads that are electrically coupled (e.g., through reflow soldering) to an electrical cable such as a flex cable 54. Flex cable 54 can be, for example, a flexible, flat cable and can be implemented as a miniaturized form of a ribbon cable. The cable can include a flat and flexible plastic film base, with multiple metallic conductors bonded to its surface. Each end of the cable can be reinforced with a stiffener to make insertion easier or to provide strain relief. Flex cable 54, in turn, can be coupled electrically to the other electronics in the television or other appliance.

Each of devices 32, 34, 40 can be located in a respective cavity of module 30 that is closed off or isolated optically from the cavities where the other devices are located. This can be accomplished by providing a spacer 48 that separates the devices from one another. Spacer 48 also serves to provide a fixed separation between substrate 46 and a lens substrate 50. In addition, a portion of spacer 48 serves as outer walls of module 30. Thus, the lower surface of optics substrate 50, inner side surfaces of spacer 48 and the device side of substrate 46 define inner areas that serve as channels for incoming/outgoing radiation (e.g., IR radiation or visible light). Spacer 48 can be made, for example, of a single piece and can comprise a generally flat body with a planar front (i.e. top) surface and a planar rear (i.e., bottom) surface. Preferably, spacer 48 is composed of, or coated with, a material that is substantially opaque to radiation in those parts of the spectrum emitted by or detected by devices 32, 34, 40.

In the illustrated implementation, IR receiver module 34 is disposed in the middle cavity of module 30, with LED 32 located in a cavity one side of the module and ambient light sensor module 40 located in a cavity on the other side of the module. This arrangement can be advantageous because ambient light sensor module 40 is disposed relatively far away from LED 32, which makes is less likely for optical cross-talk to occur between the two devices. Nevertheless, some implementations may use a different arrangement of the three devices 32, 34, 40. For example, LED 32 or ambient light sensor module 40 can be placed in the middle cavity of module 30, and IR receiver module 34 can be placed in one of the side cavities.

Lens substrate 50, which is disposed over spacer 48, includes portions 52 that are composed of a transparent material, with each transparent portion aligned over a respective one of devices 32, 34, 40. The remainder of lens substrate 50 can be composed, for example, of printed circuit board (PCB) material such as FR4 or other glass-reinforced epoxy laminate material. One or more optical elements (e.g., lenses) 56A, 56B are attached, respectively, to each of transparent portions 52. In the illustrated example, a first lens element 56A is provided at the upper surface of transparent portion 52, and a second lens element 56B is provided at the lower surface the transparent portion. Lens elements 56A, 56B can be replicated elements composed, for example, of a ultraviolet (UV)-cured polymer material such as epoxy, acrylate or polyurethane. Lens elements 56A, 56B help focus radiation (e.g., IR or visible light) to or from devices 32, 34, 40.

A baffle 58 can be provided over lens substrate 50 and can help shield sensors 34, 40 from undesired radiation or light. Baffle 58 can be made, for example, of a material substantially attenuating or blocking light generally detectable by sensor modules 34, 40, or it can be provided with a coating having such a property. In some implementations, baffle 58 is composed of the same material as spacer 48.

To further reduce the module size and thus enable the television manufacturer to build a television with a thinner bezel, the outer module walls can be omitted by filling up the cavity. An example is depicted in FIG. 4, which shows the optics being only single-sided, and the module filled up with the same or a different material that the lens is made of. This filling may be performed, for example, in the same step as the lens replication.

Although the dimensions of module 30 can vary depending on the particular application, in some cases the overall dimensions (e.g., width, length and height) are on the order of less than ten millimeters (mm). The width and/or height can be even less than five mm in some implementations. Furthermore, the height of the module 30 can be less than two mm. For example, the dimensions of a particular module with integrated ICs 38, 44 are about: 8.2 mm (length)×4.5 mm (width)×1.7 mm (height).

Multiple optical modules 30 can be fabricated, for example, in a wafer-level process. In this context, a wafer refers to a substantially disk- or plate-like shaped item, its extension in one direction (z-direction or vertical direction) is small with respect to its extension in the other two directions (x- and y-directions or lateral directions). On a (non-blank) wafer, a plurality of similar structures or items can be arranged, or provided therein, for example, on a rectangular grid. A wafer can have openings or holes, and in some cases a wafer may be free of material in a predominant portion of its lateral area. In some implementations, the diameter of a wafer is between 5 cm and 40 cm, and can be, for example between 10 cm and 31 cm. The wafer may be cylindrical with a diameter, for example, of 2, 4, 6, 8 or 12 inches, one inch being about 2.54 cm. The wafer thickness can be, for example, between 0.2 mm and 10 mm, and in some cases, is between 0.4 mm and 6 mm.

As part of the wafer-level fabrication process, multiple sets of devices 32, 34, 40 are mounted on a substrate wafer. A spacer wafer and baffle wafer, each of which has a multitude of through-holes, are provided. The spacer and baffle wafers can be composed, for example, of a UV- or thermo-curing polymer material such as epoxy, acrylate or polyurethane. The through-holes in the spacer wafer and baffle wafer can be formed, for example, by drilling, micromachining or replication techniques. In addition, a lens substrate wafer, including an array of transparent portions 52 and associated lens elements 56A, 56B, is provided. The lens substrate wafer can be prepared, for example, by forming through-holes at specified locations in a wafer composed of a PCB material, where the locations of through-holes correspond to the locations for transparent portions 52 of lens substrate 50. The through-holes can be formed, for example, by micromachining, which may include milling, drilling, laser ablation, etching and/or photolithography. In other implementations, a lens substrate wafer is formed with through-holes using a replication technique. The through-holes then are filled with a transparent material, such as transparent polymer materials (e.g., epoxy, acrylate or polyurethane) to form transparent apertures, and optical elements (e.g., lenses) are formed, for example, by a replication process such that the each aperture and its associated optical elements lie on substantially the same axis. The spacer and/or baffle wafers also can be formed by embossing or vacuum injection techniques. In the case of a vacuum injection technique, the spacer wafer can be replicated directly onto a lens substrate wafer.

The various wafers (i.e., the substrate wafer, the spacer wafer, the lens wafer and the baffle wafer) are attached to one another (e.g., by adhesive) so as to form a wafer stack in which each of the devices mounted on the substrate wafer is aligned with a respective one or more of the lenses on the lens substrate. The stack then can be separated (e.g., by dicing) into multiple individual modules 30, each of which includes a LED 32, an IR receiver module 34 and an ambient light sensor module 40. Each module 30 then can be mounted to a flex cable 54, for example, using reflow soldering.

Module 30 of FIG. 2 can be advantageous because off-the-shelf components can be used for devices 32, 34, 40, and a module with relatively small dimensions can be fabricated using a wafer-level process.

Figure 3:
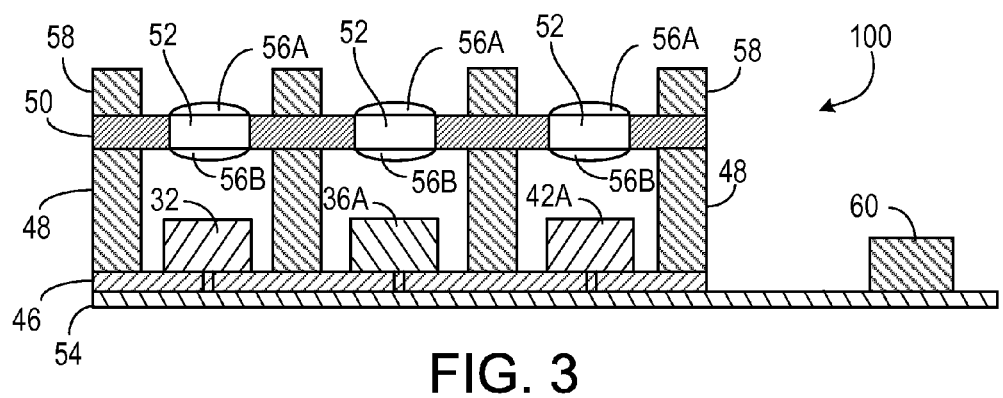
FIG. 3 illustrates another example of an optoelectronic module mounted on an electrical cable.

A module 100 with even smaller dimensions can be obtained, in some implementations, as shown in FIG. 3. Module 100 is similar to module 30 and includes different cavities each of which contains one of the following devices: a visible light LED 32, an IR sensor (e.g., a photodiode) 34 or a visible light sensor 42. However, instead of including an IR receiver module within the module, IR sensor 36A is mounted on substrate 46 without the associated IC 38. Likewise, instead of including an ambient light sensor with its associate circuitry within the module, visible light sensor (e.g., a photodiode) 42A is mounted on substrate 46 without the associated IC 44. A separate IC (e.g., silicon chip) 60 is mounted on, and electrically coupled to, electrical cable (e.g., a flexible, flat cable) 54 outside module 100. IC 60 includes circuitry for analog-to-digital conversion and signal processing. Thus, analog signals from photodiodes 36A and 42A can be transferred through flex cable 54 to external IC 60. Flex cable 54 also can be coupled electrically to the other electronics in the television or other appliance.

The implementation of FIG. 3 can be advantageous because the module 100 can, in some cases, be made even smaller and more compact. Although the dimensions of module 100 can vary depending on the particular application, in some cases the overall dimensions (e.g., width, length and height) are on the order of less than ten millimeters (mm). The width and/or height can be even less than five mm in some implementations, and in some implementations, the width and/or height can be less than two mm. For example, the dimensions of a particular module 100 are about: 6.2 mm (length)×1.2 mm (width)×1.1 mm (height).

Some implementations of module 100 may use a different arrangement of the three devices 32, 34, 40. For example, LED 32 or ambient light sensor module 40 can be placed in the middle cavity of module 100, and IR receiver module 34 can be placed in one of the side cavities.

Other aspects of module 100 (FIG. 3) can be similar to those of module 30 (FIG. 2).

FIG. 1 illustrates a television as an example of an electronic appliance which includes module 30 or module 100. Other types of appliances may incorporate these or similar modules. Examples of such other applications may include photocopiers, industrial automation systems, professional light measurement instruments, auto-exposure meters, electroencephalography, computing devices (e.g., PDAs, laptops, computers), communications devices, aviation and automotive lighting systems, VCRs, DVD and Blu-Ray players, washing machines and other household electronics and appliances.

In the foregoing examples of modules 30 (FIG. 2) and 100 (FIG. 3), the sensors 36 (and 36A), 42 (and 42A) are described, respectively, as an IR sensor and an ambient light sensor. In other implementations, one or more of the sensors can be a different type of sensor, such as a proximity sensor or an image sensor, and may detect light in other parts of the electromagnetic spectrum. Thus, for example, the first sensor can be operable to detect radiation in a first range of the electromagnetic spectrum, and the second sensor can be operable to detect light in a second different range of the electromagnetic spectrum. Such sensors as well as one or more light emitting elements can be mounted in different optical channels of the module. Furthermore, the module can have multiple optical channels (e.g., three of more) that are separated from one another by walls of the spacer and each of which contains a respective light emitting device or light sensor. The function of each sensor can be different from the functions of the other sensors, and the functions of the sensors can be different from the function associated with the light emitting device(s). Thus, for example, each of the sensors can be arranged to detect light from a source other than the light emitting devices(s).

Other implementations are within the scope of the claims.

What is claimed is:

1. An apparatus comprising:
an electrical cable; and
an optoelectronic module mounted on and electrically coupled to the electrical cable,
wherein the optoelectronic module comprises:
a first substrate;
a spacer, one end of which is attached to the first substrate, the spacer having walls that separate respective areas for at least a first optical channel, a second optical channel and a third optical channel;
a light emitting device mounted on the first substrate in the area for the first optical channel, the light emitting device operable to emit light in a visible region of the electromagnetic spectrum;
first sensor operable to detect light in a first region of the electromagnetic spectrum and mounted on the first substrate in the area for the second optical channel;
a second sensor operable to detect light in a second region of the electromagnetic spectrum, the second sensor mounted on the first substrate in the area for the third optical channel; and
a second substrate attached to a second end of the spacer, the second substrate including a first transparent region to allow light from the light emitting device to pass to outside the optoelectronic module, a second transparent region to allow light in the first region of the electromagnetic spectrum to pass from outside the optoelectronic module to the first sensor, and a third transparent region to allow light in the second region of the electromagnetic spectrum to pass from outside the optoelectronic module to the second sensor,
the apparatus further comprising an integrated circuit mounted on, and electrically coupled to, the electrical cable, wherein the integrated circuit is operable to perform analog-to-digital conversion and signal processing for signals received through the electrical cable from the optoelectronic module.

2. The apparatus of claim 1 wherein the first sensor is an infrared sensor that detects light in an infrared portion of the electromagnetic spectrum.

3. The apparatus of claim 1 wherein the second sensor is an ambient light sensor that detects light in a visible portion of the electromagnetic spectrum.

4. The apparatus of claim 1 wherein the integrated circuit is operable to perform analog-to-digital conversion and signal processing for signals received through the electrical cable from any of the light emitting device, the first sensor and the second sensor.

5. The apparatus of claim 1 wherein the light emitting element is a LED.

6. The apparatus of claim 1 wherein each of the first sensor and the second sensor comprises a photodiode.

7. The apparatus of claim 1 wherein the electrical cable is coupled to electronics in an appliance.

8. The apparatus of claim 1 wherein each of the light emitting device, the first sensor and the second sensor is coupled electrically through the first substrate to the electrical cable.

9. The apparatus of claim 1 wherein the first, second and third optical channels are arranged in a row.

10. The apparatus of claim 9 wherein the first optical channel is located on one side of the second optical channel and the third optical channel is located on a second side of the second optical channel.

11. The apparatus of claim 1 wherein the spacer is composed of, or coated with, a material that is substantially opaque to radiation in those parts of the electromagnetic spectrum emitted by the light emitting device or detected by the first sensor or the second sensor.

12. The apparatus of claim 1 wherein the electrical cable is a flexible cable.

13. The apparatus of claim 1 wherein the electrical cable is a flexible, flat cable.

14. The apparatus of claim 1 wherein each of the light emitting device, the first sensor and the second sensor is electrically coupled to the electrical cable by way of respective conductive vias through the first substrate and conductive pads on a surface of the first substrate.

15. The apparatus of claim 1 wherein the second substrate includes one or more lens elements attached to each of the transparent regions.

16. The apparatus of claim 15 wherein each of the lens elements is aligned with a respective one of the light emitting device, the first sensor or the second sensor.

* * * * *